Figure 1:
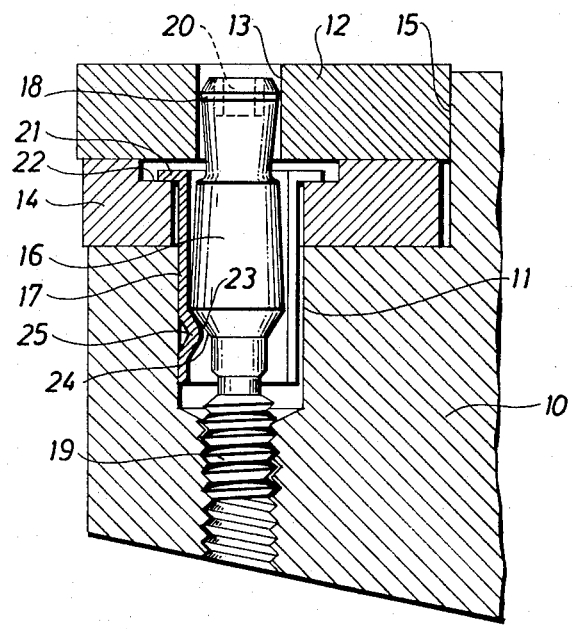

United States Patent
Roos

[11] 3,854,183
[45] Dec. 17, 1974

[54] TOOL HOLDER

[75] Inventor: Axel Sven Olof Roos, Odengatan, Sweden

[73] Assignee: Sandvik Aktiebolag, Sandviken, Sweden

[22] Filed: Jan. 28, 1974

[21] Appl. No.: 437,306

[30] Foreign Application Priority Data
Feb. 21, 1973  Sweden .......................... 73023889

[52] U.S. Cl. ................................................. 29/96
[51] Int. Cl. .............................................. B26d 1/00
[58] Field of Search ............... 29/96, 105 R, 105 A; 403/408; 52/758 F

[56] References Cited
UNITED STATES PATENTS
3,546,758  12/1970  Stier ....................................... 29/96
3,648,341  3/1972  Viellet .................................... 29/96

*Primary Examiner*—Andrew R. Juhasz
*Assistant Examiner*—William R. Briggs
*Attorney, Agent, or Firm*—Pierce, Scheffler & Parker

[57] ABSTRACT

A cutting insert and associated shim plate are clamped in a tool holder by the aid of a sleeve member at least partially surrounding the clamping pin of the holder. Said pin has a conical abutment complementary to an inclined cam surface on the sleeve member.

3 Claims, 3 Drawing Figures

TOOL HOLDER

The present invention relates to a tool holder for clamping an apertured indexable cutting insert into an insertreceiving site in the holder body so that the insert rests on a base surface which is formed by a detachable shim plate, there being a clamping pin threadably received with a loose engagement in a bore in the holder while received in the hole of the cutting insert so as to secure the cutting insert into clamping engagement with at least one lateral abutment in said site.

In order to protect the tool holder and to provide a plain bottom surface facing the insert a so-called shim plate is customarily used. The shim plate usually consists of cemented carbide in order to retain its hardness and plane surface condition even under the heat development which occurs during a cutting operation. Considerable problems here heretofore been encountered with the clamping of said shim plate. A common method is to provide the clamping pin with a collar which prevents the shim plate from dropping out. However, as the clamping pin must be movable it is impossible to prevent movement of the shim plate along its support surface and - especially if the cutting tool is mounted up and down - the engagement is so loose that a gap develops between said plate and its support surface. In connection herewith there is a risk that minor chips can come in therebetween and cause trouble in the functioning of the tool. Another problem with clamping means merely comprising a short screw or excentric pin is the risk that such means can shake loose due to the very insignificant resilience built in with such clamping system.

The present invention provides a simple solution to the problem of simultaneously clamping the cutting insert and the shim plate and also preventing the clamping pin from loosening by shaking. According to the invention there is provided a tool holder of the aforesaid type the clamping pin of which is at least partially surrounded by a sleeve member cooperating with said pin, said sleeve member being provided with a radially extending collar abutting against a support surface on the shim plate, said sleeve member also being provided with an inclined cam surface cooperating with a complementary conical abutment surface on said clamping pin, so that the clamping force exerted on said cam surface when in-screwing the clamping pin causes a component parallel to the axis of the sleeve member that urges the sleeve against the shim plate thus clamping the same while a component directed inwardly against the holder body urges the clamping pin and the cutting insert against the lateral abutment or abutments.

Figure 2:
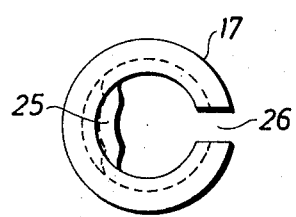
Figure 3:
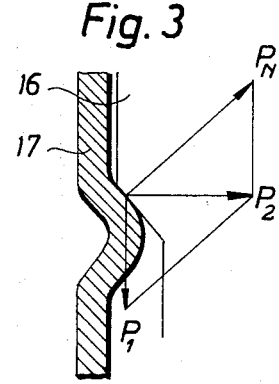

The invention will now be specifically described by way of preferred embodiment, with reference to the accompanying drawing, in which FIG. 1 is a sectional view of a tool holder in accordance with the invention;

FIG. 2 is a plan view of an elastic sleeve member that may form one part of the clamping means; and FIG. 3 is a view showing how the force components divide up at the point where the clamping pin is in contact with the elastic sleeve member.

Referring to the drawing, a tool holder comprises a shank 10 having at one end a cutting insert-receiving site. A bore 11, a portion of its length being threaded, leads to the bottom of said site. An indexable cutting insert 12 having an aperture 13 through it is received in the site. The bottom surface of the site is formed by a detachable shim plate 14 while a surface 15 forms the lateral abutment of the site. The site normally presents a bottom surface and two lateral abutment surfaces.

Two clamping members intended for cooperating are received in bore 11, viz. a clamping pin 16 the axis of which in unclamped position coincides with that of said bore, and a sleeve member 17 which at least partially surrounds said clamping pin. Said pin 16 extends into aperture 13 at one end portion, a surface portion 18 of which engages with the wall of said aperture. The clamping pin has at the opposite end portion a threaded portion 19 adapted loosely to engage with threaded bore 11 in the tool holder. Clamping pin 16 is also provided at said first end with a key grip 20 for turning and clamping.

The upper portion of sleeve member 17, as seen in FIG. 1, is provided with a radially extending annular collar 21 which rests against a corresponding annular bottom surface 22 on shim plate 14. Sleeve member 17 is, beneath said collar 21, provided with an inclined cam surface 23 adapted to cooperate with a conical portion 24 of clamping pin 16. Sleeve member 17 is manufactured of thin elastic material, said cam surface 23 being provided on an indentation 25 on the same, so that in-screwing of clamping pin 16 causes the sleeve member to yield somewhat.

When in-screwing clamping pin 16 into bore 11 its conical abutment surface 24 will be brought into contact with cam surface 23 on sleeve member 17. The normal force $P_N$ in the contact point between said clamping pin and said sleeve member can be divided up in two components as shown in FIG. 3, viz., one force component $P_1$ that urges sleeve member 17 downwards into bore 11, thus securing shim plate 14 into clamping engagement with its support surface 22, and one force component $P_2$ that causes a pivoting action of pin 16 to the right, as seen in FIG. 1, thus securing cutting insert 12 into clamping engagement with lateral abutment 15.

In order to bring about a certain frictional force that retains the elastic sleeve member and also shim plate 14, said sleeve has an axial slot 26 and the diameter of the sleeve member, when not inserted in bore 11, is larger than the diameter of said bore. Due to this the shim plate is retained in the bore even if the clamping pin is wholly removed therefrom. This will also ensure that chips or the like that normally can come in between the shim plate and lateral abutment 15 cannot penetrate inbetween the shim plate and its bottom supporting surface in the site.

I claim:

1. Tool holder for clamping an apertured indexable insert (12) into an insert-receiving site in a holder body so that the insert rests on a bottom-supporting surface which is formed by a detachable shim plate (14), these being a clamping pin threadably received with loose engagement in a portion of bore (11) in the holder while received in the hole of the insert so as to secure the insert into clamping engagement with at least one lateral abutment (15) in said site, characterized in that the clamping pin (16) is at least partially surrounded by a sleeve member (17) arranged in the bore (11) for cooperation with said clamping pin, said sleeve member being provided with a radially extending collar (21) to abut against a support surface (22) on the shim plate (14), there being an inclined cam surface (23) provided on said sleeve member cooperating with a complementary shaped conical abutment surface (24) on said clamping pin, so that the clamping force exerted on said cam surface (23) when in-screwing the clamping pin causes a component parallel to the axis of the sleeve member that urges the sleeve member against the shim plate while a component directed inwardly against the tool holder body urges the clamping pin and the insert against said lateral abutment or abutments.

2. Tool holder according to claim 1, wherein said sleeve member (17) is made of a thin piece of elastic material, said cam surface (23) being provided on an indentation (25) so as to enable said sleeve member to yield somewhat when in-screwing the clamping pin thus preventing loosening of said pin by shaking.

3. Tool holder according to claim 2, in which the sleeve member (17) is provided with an axial slot (26).

* * * * *

UNITED STATES PATENT OFFICE
CERTIFICATE OF CORRECTION

Patent No. 3,854,183  Dated Dec. 17, 1974

Inventor(s) AXEL SVEN OLOF ROOS

It is certified that error appears in the above-identified patent and that said Letters Patent are hereby corrected as shown below:

Column 2, line 57,
Claim 1, line 4 "these" should read there

Signed and sealed this 11th day of February 1975.

(SEAL)
Attest:

RUTH C. MASON
Attesting Officer

C. MARSHALL DANN
Commissioner of Patents
and Trademarks